G. W. HATCH.

Button-Fastenings.

No. 8,629. Reissued Mar. 18, 1879.

Witnesses:

H. F. Megill

Sam. Hendrickson.

Inventor:

Geo. W. Hatch, by E. L. Megill,

Atty

N. PETERS, PHOTO-LITHOGRAPHER, WASHINGTON, D. C.

UNITED STATES PATENT OFFICE.

GEORGE W. HATCH, OF BROOKLYN, NEW YORK.

IMPROVEMENT IN BUTTON-FASTENINGS.

Specification forming part of Letters Patent No. 172,733, dated January 25, 1876; Reissue No. 8,629, dated March 18, 1879; application filed November 13, 1878.

*To all whom it may concern:*

Be it known that I, GEORGE W. HATCH, of Brooklyn, county of Kings, and State of New York, have invented certain new and useful Improvements in Fasteners for Buttons on Boots and Shoes, of which the following is a specification:

The object of my invention is to provide fasteners for buttons on boots and shoes and garments in general which are cheap to manufacture, readily applied, and which hold the buttons firmly to the fabric. As these fasteners lie perfectly flat to the inner side of the fabric they can be used without inconvenience or injury to the body of the wearer, and as they can be just as readily detached from as attached to the fabric, the buttons can be changed with but little trouble.

My invention consists in bending, stamping, or casting button-fasteners in the form of a single straight piece of wire, the center of which is formed into a recess in the shape of a semicircle. The ends or arms extending outward from this recess in a straight line are flattened, and are turned or bent upward toward the points.

It will be readily understood that the eye of the button is resting in the recess of the fastening, and that the extreme ends of the arms embed themselves into the fabric, and thus make accidental detaching of the button impossible.

Flattening the metal at the arms hardens and stiffens the wire, and enables the fasteners to withstand the strain of the button without bending or drawing through the hole in the leather or fabric made for the purpose of attaching the fastening to the eye of the button, by which, also, all injury to the body of the wearer is prevented.

In order to describe my invention more fully, I refer to the accompanying drawings, forming part of this specification.

Figure 2:
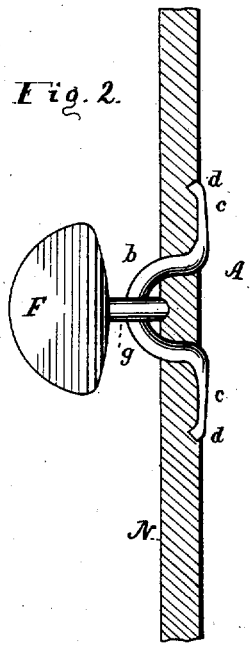
Figure 3:
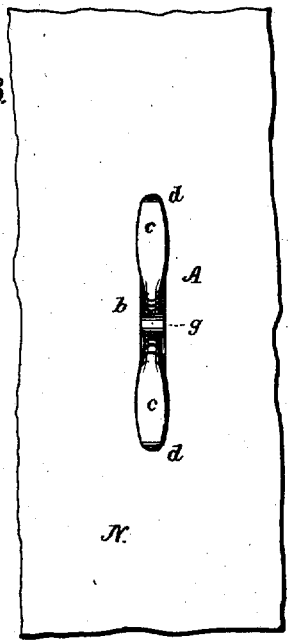
Figure 1:
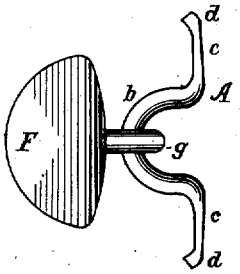

Figure 1 is a perspective view of my fastener with a button attached thereto. Fig. 2 is a sectional view of a button attached to the fabric by aid of my improved fastener. Fig. 3 is a back view of my improved fastener when attached to the fabric.

A is the fastener, with the recess *b*, the arms *c c* flattened and turned up or pointed at the ends *d d*. F is a button, with eye *g*, and N is the fabric.

Having thus described my invention, I desire to claim—

A button-fastener which is attachable and detachable by hand, having a recess or loop, *b*, flattened arms *c c*, and points *d d* at right angles to said arms, which are adapted to be embedded into the inner surface of the leather or fabric, substantially as herein described and set forth.

GEORGE W. HATCH.

Witnesses:

HENRY F. MEGILL,

WILLIAM F. OLLIFFE.